United States Patent Office 2,833,628
Patented May 6, 1958

2,833,628

MANUFACTURE OF SILICON TETRAFLUORIDE

Melvin C. Molstad, Swarthmore, Pa., assignor to W. R. Grace & Co., New York, N. Y., a corporation of Connecticut No Drawing. Application June 9, 1954
Serial No. 435,628

5 Claims. (Cl. 23—205)

This invention relates to a process for the preparation of silicon tetrafluoride. In one specific aspect, it relates to the preparation of pure silicon tetrafluoride. In another specific aspect, it relates to the recovery of pure silicon tetrafluoride from the gaseous reaction products of the phosphate rock acidulation process to form superphosphate.

In the past silicon tetrafluoride has been prepared by reacting silica with either a fluoride or silicofluoride salt and an excess of sulfuric acid. The products of these reactions, in addition to silicon tetrafluoride, include water, and the corresponding sulfate. These methods require the addition of heat and, of course, consume sulfuric acid, which is left contaminated with the sulfate formed. Silicon tetrafluoride may also be prepared by thermal decomposition of a metal silicofluoride. The other product of this decomposition is a solid metal fluoride. While this reaction provides silicon tetrafluoride of a high degree of purity, considerable heat is required to effect the decomposition. For example, when the reaction is conducted with barium silicofluoride, a temperature of 400°–500° C. is required. Furthermore, the decomposition is usually conducted at sub-atmospheric pressures.

Phosphate rock contains about 3–4% fluorine, about 20–40% of which is evolved in the sulfuric acid acidulation process to form superphosphate. The off-gas stream contains air, water vapor, carbon dioxide, and between about ½% and 1% by volume of silicon tetrafluoride. While these off-gases represent the cheapest known source of silicon tetrafluoride, separation of that material in a pure form from the gas stream is technically and economically impractical. Fluorine values are recovered by absorption of the off-gas stream in water to form silica and fluosilicic acid of concentrations between about 20% and 28% by weight $H_2SiF_6$. Approximately half of the silica formed is easily filtered from the crude fluosilicic acid, while the balance of the silica in very finely divided or colloidal form remains suspended in the filtered acid. Fluosilicic acid is a well known article of commerce and reacts with alkalies to form the corresponding silicofluorides, which have many uses. Solutions of fluosilicic acid decompose upon heating to form silicon tetrafluoride and hydrofluoric acid, and it is difficult, if not impossible, to separate the gaseous products.

In accordance with the present invention, it is now possible to prepare pure silicon tetrafluoride in substantially quantitative yields from fluosilicic acid.

It is therefore an object of this invention to provide an improved method for preparing silicon tetrafluoride of a high degree of purity. It is another object to provide a method of preparing silicon tetrafluoride from fluosilicic acid. It is still another object to provide a process for recovering substantially pure silicon tetrafluoride from the off-gases of the phosphate rock acidulation process. Other objects and advantages of the present invention will be apparent to those skilled in the art from the following detailed description and the appended claims.

The process of the present invention comprises reacting fluosilicic acid and silica in the presence of sulfuric acid of a concentration greater than 70% by weight $H_2SO_4$ to form silicon tetrafluoride. The reaction involved in the present invention proceeds according to the following equation:

$$2H_2SiF_6 + SiO_2 \rightarrow 3SiF_{4(g)} + 2H_2O$$

While the reaction is conducted in sulfuric acid, the acid does not enter into the reaction. The sulfuric acid serves as a dehydrating agent, being diluted by the water of the fluosilicic acid solution as well as that formed in the reaction, and as a reaction medium in which silicon tetrafluoride is not soluble to any marked extent. The affinity of the sulfuric acid for the water present prevents the normal reaction between silicon tetrafluoride and water as illustrated by the reverse of the above equation.

The fluosilicic acid starting material may be technical grade acid which usually runs about 20–28% $H_2SiF_6$ and contains a minimum of silica. In this case, additional silica will be added to satisfy the above equation for maximum recovery of silicon tetrafluoride. However, the present invention is particularly well adapted to the use of unfiltered fluosilicic acid which is readily available at existing superphosphate manufacturing facilities. This mixture of fluosilicic acid and silica results when the off-gases of the rock acidulation process are scrubbed with water. This fluosilicic acid containing as much as possible of the silica formed may be fed directly from the scrubbing towers, and, without filtration, to a reaction vessel containing concentrated sulfuric acid. In accordance with the present invention, the above equation is caused to proceed from left to right in the presence of strong sulfuric acid, and silicon tetrafluoride, free of contaminating air and carbon dioxide as well as other impurities, is evolved, passed through a suitable drying zone and recovered in substantially quantitative yields.

The sulfuric acid reaction medium is maintained at all times sufficiently concentrated so that the dehydrating ability of this acid may be utilized to hold all of the water present, thereby preventing hydrolysis of the silicon tetrafluoride product. The lower practical limit of concentration is about 70% by weight $H_2SO_4$. While the reaction between fluosilicic acid and silica proceeds satisfactorily in sulfuric acid of below 70% concentration, silicon tetrafluoride becomes increasingly more soluble in sulfuric acid as the acid is further diluted, with the result that the yield of product is significantly reduced. The solubility of silicon tetrafluoride in sulfuric acid of varied concentration has been noted as follows:

TABLE

| Percent $H_2SO_4$ by Weight | Solubility at 75° F. cc. $SiF_4$/100 cc. Acid |
|---|---|
| 90 | 4 |
| 84.8 | 4 |
| 79.1 | 6 |
| 76.5 | 12 |
| 72.7 | 36 |
| 70.1 | 132 |
| 66.5 | 580 |

Thus, at 75° F. the solubility and consequent loss of $SiF_4$ becomes significant at about 73% $H_2SO_4$. Since the process involved in the present invention is slightly exothermic, the temperature of the reaction medium will ultimately reach about 120°–160° F., and at these temperatures the solubility of $SiF_{4(g)}$ is somewhat lower than indicated above. Therefore, the lower practical limit of sulfuric acid concentration is about 70%.

At the start-up of the present process the reaction vessel is provided with sulfuric acid of a concentration above 70% and preferably about 93% by weight $H_2SO_4$, because of the ready commercial availability of acid of this concentration. Obviously, the higher the concentration of $H_2SO_4$ in a given quantity of acid at start-up of the present process, the greater the volume of fluosilicic acid of a given concentration which may be added thereto before the concentration of sulfuric acid reaches its lower limit.

The reaction involved in the present invention proceeds smoothly with quantitative yields of pure dry silicon tetrafluoride. Excess silica is not required; when, however, more than that stoichiometrically required is present additional reaction surface is provided, which tends to facilitate the reaction with fluosilicic acid. When crude fluosilicic acid, i. e. the unfiltered product obtained by scrubbing of the rock acidulation off-gases, is employed, theoretically no additional silica is required for complete recovery of silicon tetrafluoride. However, additional silica facilitates the reaction as noted above. The silica which is added is preferably substantially pure dry $SiO_2$, for example, silica gel. Impure silica may also be employed so long as it does not contain constituents which react with or become volatile upon contact with $H_2SO_4$ which would contaminate the silicon tetrafluoride product. The particle size of the silica is preferably between about 8 and 30 mesh.

The present invention is further illustrated in the following non-limiting example.

*Example*

A 5 liter 3-neck flask was fitted with a mercury-sealed stirrer, fluosilicic acid inlet tube reaching to the bottom of the flask, and a product exit tube originating above the liquid level in the flask and connected to a $P_2O_5$ moisture trap and thence to a series of gas storage vessels. The latter consisted of single 22 inch diameter plastic balloons each in a 12-gallon glass carboy. The flask was first charged with 2350 ml. of 98% sulfuric acid and 240 gms. of 8–20 mesh silica gel, and the stirrer set in operation. Then 1750 g. of 21% fluosilicic acid solution was gradually introduced below the surface of the sulfuric acid from a graduated dropping funnel located about 2 feet above the flask. Silicon tetrafluoride gas was evolved immediately upon addition of the fluosilicic acid and the rate of generation of silicon tetrafluoride was proportional to the rate of addition of fluosilicic acid. The reaction was easily interrupted by stopping the flow of fluosilicic acid. While no attempt was made to collect all of the silicon tetrafluoride evolved, 90 liters at atmospheric pressure and room temperature was collected in the above mentioned gas receivers. A volume of 93 liters was theoretically possible at 75° F. and 1 atmosphere pressure. The temperature of the reaction mix in the flask was observed to rise from about 75° F. to about 120°–150° F. during the reaction. Following the addition of all of the fluosilicic acid and after evolution of silicon tetrafluoride ceased, agitation of the sulfuric acid was stopped and the liquid remaining in the flask analyzed and found to contain only 0.04% by weight of fluorine. This indicated that the reaction had proceeded almost quantitatively. A heel of silica remained in the sulfuric acid since slightly more than three times the stoichiometric amount of silica had been added originally. The final concentration of the sulfuric acid was 73.8%.

The present process is also amenable of continuous operation, and this embodiment is particularly well suited to a cyclic process for recovering pure silicon tetrafluoride from the off-gases of the phosphate rock acidulation process. The off-gases of the rock acidulation are scrubbed with water and the resulting crude fluosilicic acid-silica mixture is continuously fed to a reaction vessel which is continuously supplied with 93 to 98% sulfuric acid. Additional silica is added to the reaction vessel to maintain an excess over that required to react with the fluosilicic acid for reasons already mentioned. Pure silicon tetrafluoride is evolved, passed through a suitable moisture trap and thence to storage. Sulfuric acid which has been diluted by the water of the fluosilicic acid solution and that which is formed during the reaction is continuously withdrawn from the reaction vessel and is employed to acidulate phosphate rock. The acid usually employed in phosphate rock acidulation is between about 70% and 75% $H_2SO_4$. As already mentioned, the final concentration of the sulfuric acid leaving the reaction vessel is preferably above about 70% by weight $H_2SO_4$ in order that it contain only a small amount of fluorine as silicon tetrafluoride. If the acid is permitted to become more dilute a progressively larger amount of silicon tetrafluoride will be absorbed therein. This absorbed silicon tetrafluoride will not be lost in the cyclic process, however, since it will again be liberated by the heat generated in the rock acidulation, and may again be recovered.

The present invention thus provides a very efficient and economical method for recovering pure silicon tetrafluoride from the off-gases of the phosphate rock acidulation process as well as from crude or technical grade fluosilicic acid. Furthermore, the process is easily controlled, and does not require the addition of heat.

I claim:

1. A process for preparing substantially pure silicon tetrafluoride which comprises providing a body of sulfuric acid stronger than 70% by weight $H_2SO_4$, continuously introducing to said body fluosilicic acid, maintaining at all times a quantity of silica in said body of sulfuric acid at least sufficient to react completely with the fluosilicic acid added, continuously feeding sulfuric acid to said body to maintain its concentration above 70% and withdrawing sulfuric acid of a concentration not less than about 70% by weight $H_2SO_4$, and continuously removing substantially pure silicon tetrafluoride.

2. A process for recovering substantially pure silicon tetrafluoride from the off-gases produced in the acidulation of phosphate rock with sulfuric acid to form superphosphate, which comprises scrubbing said off-gases with water to form a solution of fluosilicic acid contaminated with silica, introducing said solution of fluosilicic acid and silica into a body of sulfuric acid stronger than 70% by weight $H_2SO_4$, maintaining at least a sufficient quantity of silica in the reaction mixture to react completely with the fluosilicic acid added, continuously adding sulfuric acid to said body to maintain its sulfuric acid concentration above 70% and withdrawing sulfuric acid from said body, admixing said withdrawn acid with finely divided phosphate rock to form superphosphate and silicon tetrafluoride-containing off-gases, and removing substantially pure silicon tetrafluoride from said body of sulfuric acid.

3. A process for preparing substantially pure silicon tetrafluoride from crude silica-containing fluosilicic acid which comprises contacting said silica-containing fluosilicic acid with sulfuric acid which is maintained stronger than 70% by weight $H_2SO_4$, the quantity of silica present in the reaction mixture being at least sufficient to react completely with the fluosilicic acid present, and recovering substantially pure silicon tetrafluoride from the reaction mixture.

4. A process for preparing substantially pure silicon tetrafluoride which comprises contacting fluosilicic acid with at least its stoichiometric equivalent of silica in a body of sulfuric acid, the concentration of which is at all times greater than 70% by weight $H_2SO_4$, and removing substantially all of the silicon tetrafluoride formed from the reaction mixture.

5. A process for preparing substantially pure silicon tetrafluoride from crude silica-containing fluosilicic acid which comprises contacting said silica-containing fluosilicic acid with concentrated sulfuric acid which contains at least a concentration of 70% $H_2SO_4$ at the completion of the reaction, the quantity of silica present in the reaction mixture being at least sufficient to react completely with the fluosilicic acid present, and recovering substantially pure silicon tetrafluoride from the reaction mixture.

References Cited in the file of this patent

UNITED STATES PATENTS

| 1,994,070 | Foss | Mar. 12, 1935 |
| 2,504,446 | Plusje | Apr. 18, 1950 |

OTHER REFERENCES

Mellor: "Comprehensive Treatise . . . Theoretical Chemistry" (1925), vol. 6, pages 935 and 936.